US006628867B1

(12) United States Patent
Solntsev

(10) Patent No.: US 6,628,867 B1
(45) Date of Patent: Sep. 30, 2003

(54) FIBER OPTIC REAL TIME DISPLAY SYSTEM

(76) Inventor: Alexander Solntsev, 110 Walden Cir., Sugar Land, TX (US) 77478

( * ) Notice: Subject to any disclaimer, the term of this patent is extended or adjusted under 35 U.S.C. 154(b) by 9 days.

(21) Appl. No.: 09/665,566

(22) Filed: Sep. 19, 2000

(51) Int. Cl.⁷ ................................................ G02B 6/06
(52) U.S. Cl. ...................... 385/116; 385/115; 385/120; 385/121; 362/559
(58) Field of Search ............................... 385/116, 115, 385/120, 121; 362/559

(56) References Cited

U.S. PATENT DOCUMENTS

| | | |
|---|---|---|
| 5,082,350 A | 1/1992 | Garcia et al. |
| 5,101,466 A | 3/1992 | Reidinger |
| 5,127,078 A | 6/1992 | Terry et al. |
| 5,150,445 A | 9/1992 | Toyoda et al. |
| 5,231,689 A | 7/1993 | Reidinger |
| 5,247,600 A | 9/1993 | Williams et al. |
| 5,293,437 A * | 3/1994 | Nixon .......................... 385/115 |
| 5,303,373 A * | 4/1994 | Harootian, Jr. .............. 385/115 |
| 5,508,892 A | 4/1996 | Laczynski et al. |
| 5,572,034 A | 11/1996 | Kerellas |
| 5,668,907 A | 9/1997 | Veligdan |
| 5,818,998 A | 10/1998 | Harris et al. |
| 5,911,024 A * | 6/1999 | Wallace ....................... 385/120 |
| 5,974,215 A | 10/1999 | Bilbro et al. |

* cited by examiner

Primary Examiner—Thong Nguyen
Assistant Examiner—Leo Boutsikaris
(74) Attorney, Agent, or Firm—Nick A. Nichols, Jr.

(57) ABSTRACT

In a fiber optic display system an array of pixels form a continuous viewable surface. Each pixel is formed by a bundle of one or more optical fibers which vector light to the pixels from one or more light sources. High density of pixels at the viewable surface is achieved by bundling small diameter optical fibers adapted for vectoring light from a low density light sources. The two-dimensional geometry of the viewable surface is de-coupled from the light source which is arranged in a three dimensional space.

7 Claims, 3 Drawing Sheets

FIBER OPTIC REAL TIME DISPLAY SYSTEM

BACKGROUND OF THE DISCLOSURE

The present invention relates to display systems, in particular, to display systems presenting real time high-definition images over a large viewing area viewable at short distances and wide angle.

The prior art in the field of fiber optic display systems can be partitioned into two distinct groups: fixed content, and real time displays. The fixed content fiber optic displays encompass the devices whose image content is predetermined prior to their operation, and either does not change or has a repeating cycle during operation. These devices include a variety of lighted signs, decorative devices, and many others. These fixed content displays are not suitable or practical to be used for real time images.

Real time fiber optic displays encompass a device whose image content is generated at the time of its operation and is changed at a suitable rate to produce an appearance of a continuous image. The fiber optic displays comprising the current art can be characterized as devices based on generation of images by low or lower density fiber at the viewable surface in relation to high or higher density fiber at the image source. Such devices are referred to hereinafter as low to high density (LHD) devices.

In general, an LHD device is characterized by a light source generating an image or images displayed at a viewing surface where fiber density is lower in comparison to the fiber density at the light source. In other words, these devices display an image on a viewing surface by expanding fiber optic bundles from a high density arrangement at image acquisition or at the image source to a lesser density arrangement at the image display or viewing surface.

The LHD fiber optic devices are suitable as image display systems, but they suffer from a number of deficiencies. The primary deficiency of these systems is that image quality of the displayed image cannot exceed the image quality of the image being generated by the source. For example, an image being generated by pixels transmitting red, green, and blue (RGB) light at 1280×1024 resolution, which is equivalent to that of a contemporary computer CRT monitor, onto a 2560×2048 fiber bundle will produce only 1280×1024 images distributed over a surface area that is four times larger.

Another deficiency found in prior art devices is that projection of the image onto high-density fibers can suffer from misalignment between pixels of the projector and the individual fiber strands of the bundle. The misalignment can be generally attributable to gaps between both fibers and pixels, small fiber diameters and pixel size, and projection of the image at a short distance to the fiber. A number of solutions for light to fiber projection are handled by injection of light into the fiber. A number of injection solutions have been established in the art including coating of the fibers with phosphor or other compounds of similar properties. It can be argued that such solutions have not been shown sufficiently practical since the individual components of such techniques, when applied as a whole, present many difficulties. A particular problem is with the tripling of the amount of fiber to deliver an RGB output when coating different strands with each RGB component. This can be compensated by coating the same strands with all RGB components, but at the expense of increase in difficulty of fabrication.

The real time display system of the present invention represents a novel approach to image generation where the image on the viewing area is produced by reduction from the image generating area. Generally, contemporary image-generating devices found in the art function as image enlarging apparatus where the image is increased from the image generating area to the image viewing area. The novel approach of the present invention may be at first seen as counter productive as the goal of image generation is to produce higher quality images over a large surface. Contrary to such initial observation, it will be observed that the real time display system of the present invention is particularly suitable to produce large scale high definition display devices, such as video walls.

It is therefore an object of the present invention to provide a real time display system having a high-density fiber display surface and a low density image generating source.

It is another object of the present invention to provide a real time display system reducing the difficulty of fabrication of a fiber optic display system by eliminating the requirement of assembling the fibers at high densities at the image generating source.

It is another object of the present invention to provide a real time display system utilizing the light vectoring abilities of optic fibers to de-couple the two dimensional geometry of the image display surface from the geometry of the image light sources.

It is still another object of the present invention to provide a real time display system utilizing a two-dimensional viewing surface in combination with other components arranged in a three-dimensional space thereby altering the alignment of those components in relation to the viewable surface.

It is yet another object of the invention to provide a real time display system including a display having small pixel diameters on the viewable surface forming high pixel densities enabling display of high definition images.

SUMMARY OF THE INVENTION

The display system of the invention comprises an array of pixels forming a continuous viewable surface. Each pixel is formed by a bundle of one or more optical fibers which vector light to the pixels from one or more light sources. High density of pixels at the viewable surface is achieved by bundling small diameter optical fibers adapted for vectoring light from light sources arranged at a density lower than that of the viewable pixels. The two-dimensional geometry of the viewable surface is de-coupled from the light source which is arranged in a three dimensional space thereby compensating for the difference in densities.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1:
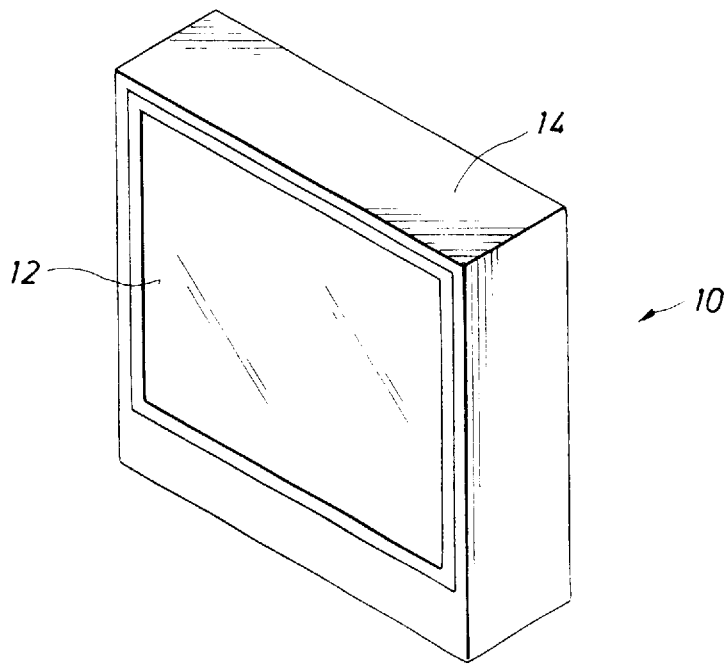
FIG. 1 is a perspective view of the real time image display device of the invention.

Referring first to FIG. 1, the fiber optic real time image display device of the invention is generally identified by the reference numeral 10. The display device 10 includes a fiber optic display 12 enclosed in an enclosure or casing 14. The shape of the casing 14 shown in FIG. 1 is for illustrative purposes. It is understood that the casing 14 may be any shape or size manufactured using well known techniques and materials to meet the desired specifications for housing the components of the display device 10.

Figure 2:
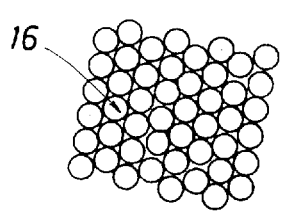
FIG. 2 is an enlarged end view of an array of pixels of the invention.

The fiber optic display 12 comprises an array of pixels 16 organized into a mesh pattern, for example, as shown in FIG. 2. The array of pixels 16 forms a continuous surface that may be flat, concave, or convex. The pixels 16 generate an optical image by free-emitting light into space either directly or through a translucent material with or without light scattering properties, or by emitting light through lenses, cones, spheres, prisms, or other optical components.

Each pixel 16 is formed by one or more optical fibers. The optical fibers vector the light to each pixel 16 from one or more distant light sources of homogeneous or heterogeneous type working in conjunction or independently. The number of fibers per pixel is determined by the homogeneity of the types of light source, with one fiber for each type of light source. The restriction of a single fiber to a single light source type, in the example discussed herein, is strictly for limiting the total fiber count to insure the display's practicality. For example, a display with pixel density of 32×32 pixels per inch will require 1024 fibers per inch for a homogeneous light source, but will require 2048 fibers per inch for a heterogeneous light source wherein the number of strands per pixel is increased to 2. In general, the larger the total fiber count for the same pixel density, the lesser is the display's practicality.

Figure 3:
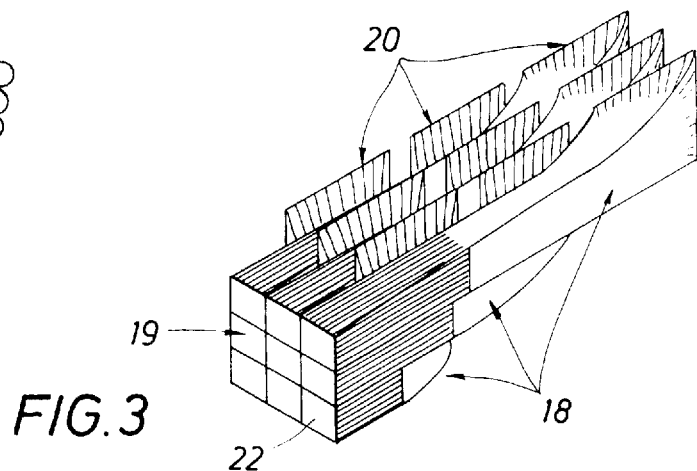
FIG. 3 is a perspective view of optical fiber bundles of the invention depicting optical fibers extending from a viewable surface and terminating at one or more light sources.

The strands of optical fiber are organized into bundles 18. Each fiber bundle 18 corresponds to a surface area 19 of the display surface 12, as best shown in FIG. 3. The organization of fibers into bundles 18 is not limited to the square arrangement of surface areas 19 shown in FIG. 3, but may be of any other arrangement including but not limited to flat ribbons, diamonds, and rectangles. Any arrangement of optical fibers that increases the ease of assembly of the display surface 12 is suitable.

Each fiber optic bundle 18 teriminates at one or more light source components 20. The number of light source components 20 is a matter of choice. In FIG. 3, each fiber optic bundle 18 terminates at a single light source component 20 of a homogeneous light source type. In a heterogeneous system, each bundle 18 would terminate at multiple components 20, one for each type of light source.

Referring still to FIG. 3, the light source components 20 are organized together in a three dimensional arrangement which is a feature of the fiber optic system of the invention. The three-dimensional arrangement is shown as a cube with light source components 20 organized into separate planes perpendicular to the axis of the display surface 12. Other three-dimensional arrangements and organization orientation could be used to achieve the same results. Similarly, an angle other than 90° of orientation could also be used. Likewise, the light source components 20 shown in close proximity to the viewing surface 19 in FIG. 3 is intended only as a means for reducing the total volume of fibers used for the display's construction.

In FIG. 3, three light source components 20 lying in a single plane are shown. It is understood, however, that the specific number of light source components 20 per single plane is for illustrative purposes and simplification of the drawings. Likewise, the arrangement of fiber bundles 18 into squares versus other geometric shapes is for illustrative purposes only. In the illustration of FIG. 3, a portion of the display surface 12 of the fiber optic device 10 of the invention is depicted as an arrangement of surface units 22 forming a 3×3 square. Assuming that the vertical and horizontal dimensions of a surface unit 22 is 1 inch, the corresponding square depicted in FIG. 3 is 3"×3". To produce a 36"×36" display surface 12 using the above ratio, an arrangement of 36×36 light source components 20 would be required. In other words, the display surface 12 would comprise 1296 surface units 22 optically connecte oriented perpendicular to the display surface 12. The light source components 20 are fixed in a suitable manner to the display enclosure 14 applying means and methods well know in the art. The components are powered by electrical circuitry and are controlled by electronic integrated and microprocessor circuitry of well known designs.

Another important feature of the system is the pixel density at the viewing surface units 22 and the density of the fiber optic terminations at the surface units 22 is equal to or greater than the density of the fiber optic terminations at the light source components 20. Hence the display system of the invention is referred to herein as a high to low density (HLD) fiber optic display in contrast to the low to high density (LHD) fiber displays discussed as part of prior art.

The HLD architecture permits the fiber optic display system 10 of the invention to achieve a high quality picture without placing size restrictions on the characteristics of the light source or sources 20. Consequently, light source components 20 may be constructed using almost any of the off-the-shelf low density image generating devices well know in the art. Such image generating light sources include but are not limited to lasers, Cathode Ray Tubes (CRT), Liquid Crystal Displays (LCD), Light Emitting Diodes (LED), and lamps.

Figure 4:
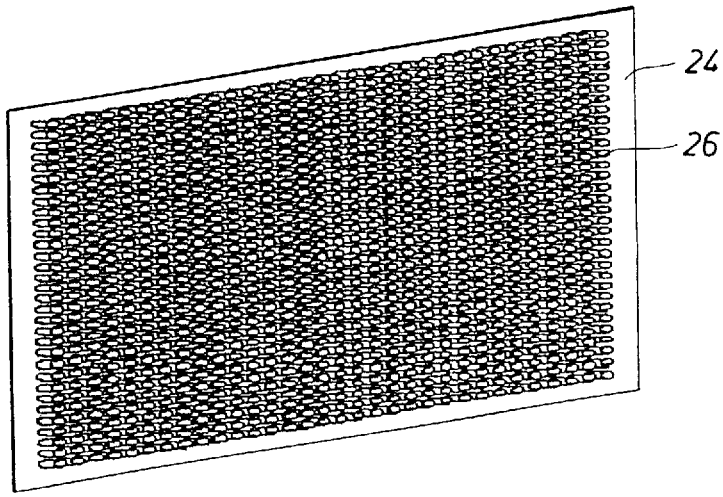
FIG. 4 is a perspective view of a LED board of the invention without fiber optic strands attached to each LED.
Figure 5:
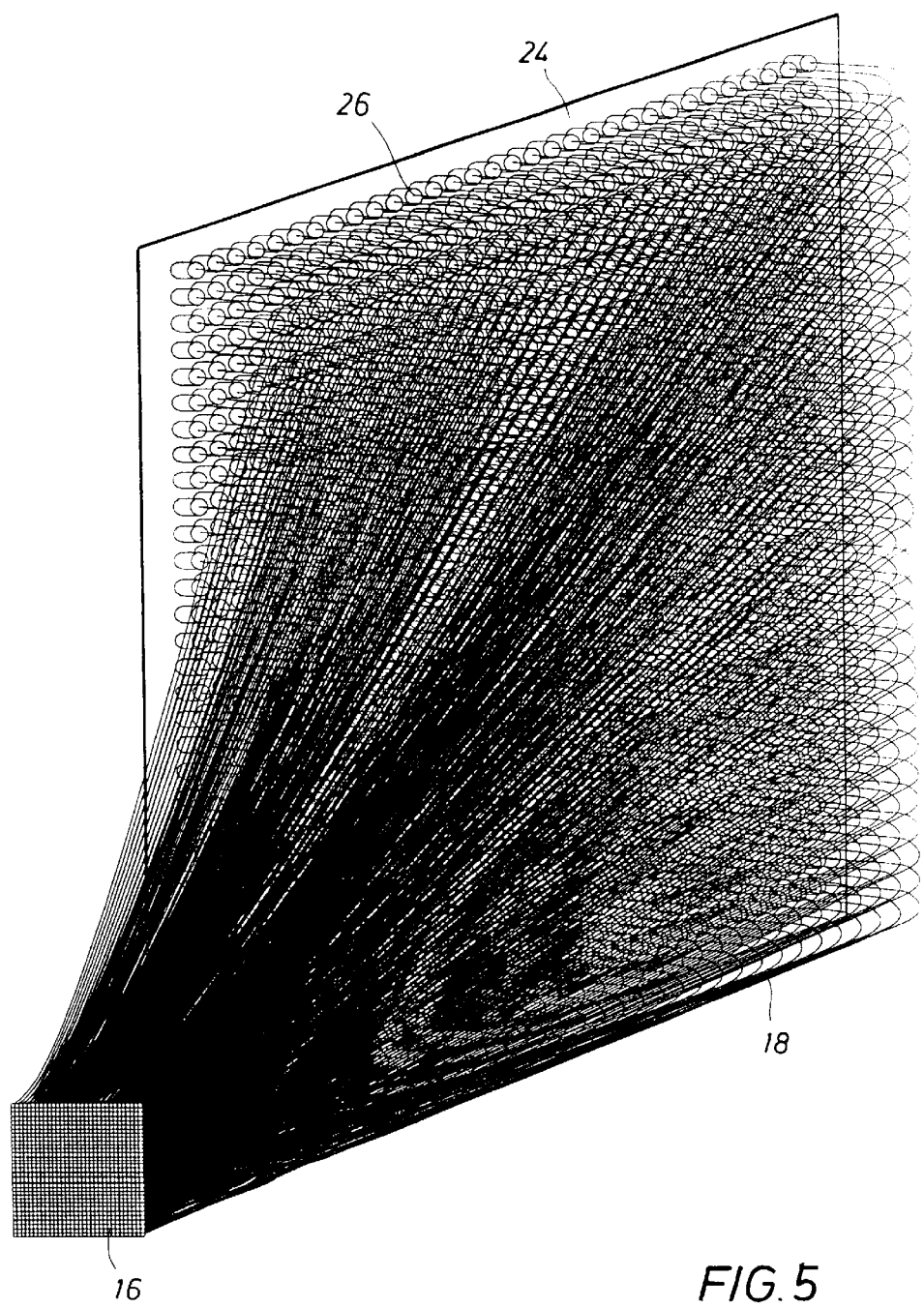
FIG. 5 is a perspective view of a LED board of the invention with fiber optic strands attached to each LED.

When employing light emitting devices, the fiber optic display system 10 described heretofore is referred to as a Homogeneous Light Injecting (HoLI) system since it based on use of homogeneous light source types that inject the light into the fiber. The off-the-shelf sources that may be used for a HoLI system are LED, lasers, and equivalent light emitting sources as noted above. These sources emit light at different visible spectrum and intensity, and may be constructed to produce either a composite RGB signal or a single wide spectrum signal in an individual fiber strand. The light injecting source or groups of sources are formed into components and are fixed to circuits boards of any suitable manufacture using any applicable method know in the art. An illustration of a sample board 24 with 32×32 LEDs 26 is shown in FIGS. 4 and 5, which show the same board with and without fiber optic strands attached to each LED 26. The LEDs 26 are shown attached to one side of the board solely for the purpose of simplifying the diagram.

Figure 6:
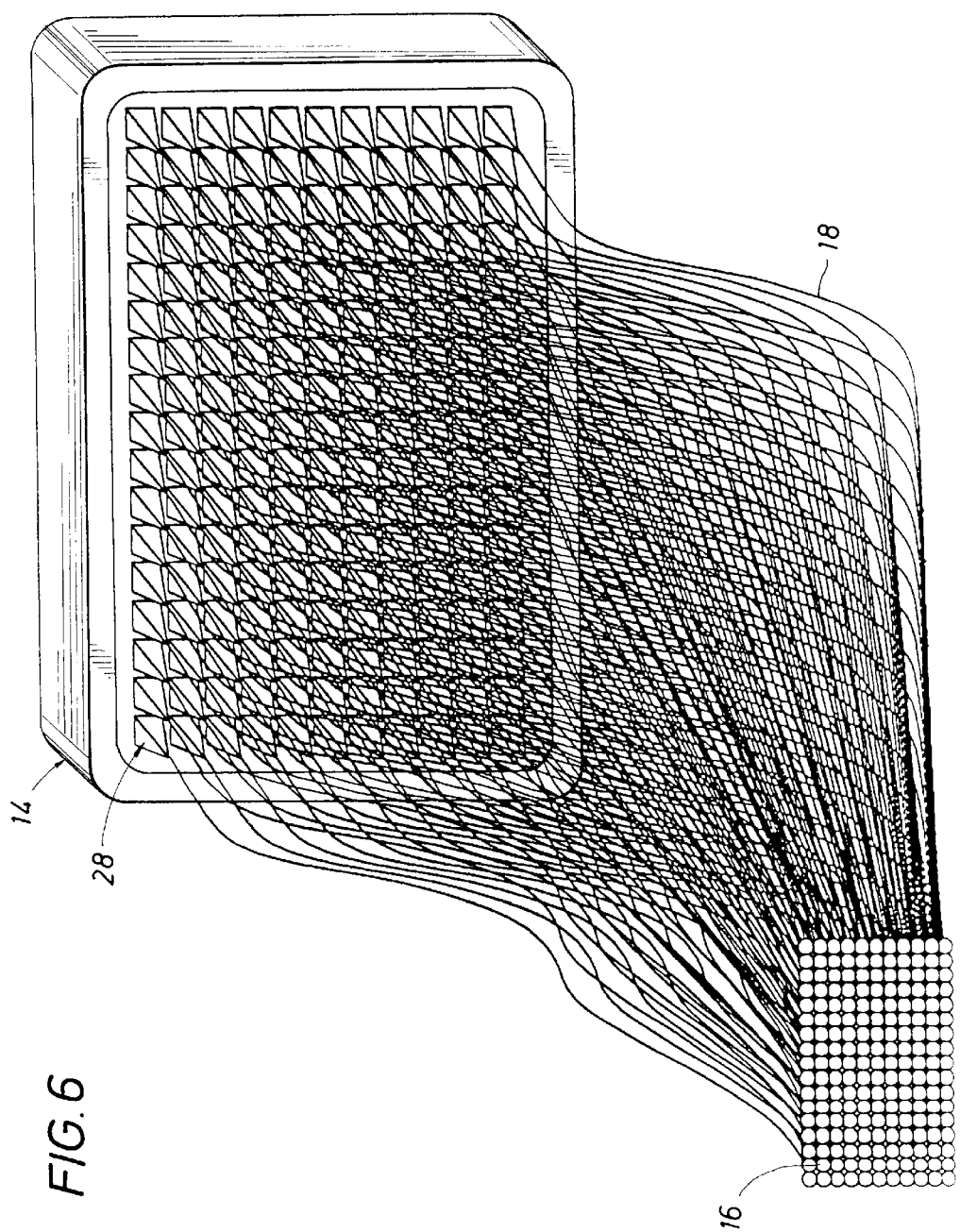
FIG. 6 is a perspective view of a LCD light source illustrating a homogeneous light projecting device of the invention.

In an alternate embodiment of the display system of the invention illustrated in FIG. 6, off-the-shelf light source components, such as LCDs, CRTs, and equivalent devices capable of projecting light onto a fiber, are utilized. In this embodiment, the display system is referred as a Homogeneous Light Projecting (HOLP) system since it uses a homogeneous light projecting type of device, such as a LCD 28, as a light source. The LCD 28 viewable surface is composed of an array of pixels generating RGB or similar based images by emitting a narrow spectrum wide intensity visible light. Since there is a problem in alignment of light between RGB pixels and the fiber, no attempt is made to align individual pixels to fiber. Instead, an N×M image generated by a projecting device is partitioned into a (N/(n+g))×(M/(m+g)) array of light source cells, where n is the cell height in pixels, m is the cell width in pixels, and g is the pixel size of the gap between cells. For example, a 240×720 color LCD display can be used to form a 40×62 cell array of 5×5 pixel cells with 1 pixel gap. Each cell has a light focusing device such as a lens or equivalent to concentrate projected light output by the 5×5 color pixels into the optical fiber.

In another alternate embodiment of the system of the invention, the HLD fiber optic display uses light from multiple types of light sources. The display is essentially a combination of multiple groups of light components that are either HoLI or HoLP in construction. The components can be used in conjunction to provide light source for the same pixels or independently to provide source to separate pixels.

While a preferred embodiment of the invention has been shown and described, other and further embodiments of the invention may be devised without departing from the basic scope thereof, and the scope thereof is determined by the claims which follow.

What is claimed is:

1. A fiber optic display system, comprising:
   a) a viewing screen secured within a housing, said viewing screen having a screen surface for generating optical real time images;
   b) an array of pixels forming said screen surface, wherein said screen surface has a first pixel density and each pixel in said array of pixels is formed by a bundle of one or more optical fibers, each of said fibers having a first end and a second end;
   c) light source means having a second pixel density for producing light comprising an image, said light source means being adapted to receive said second end of said optical fibers;
   d) wherein said array of pixels are arranged in a predetermined order for displaying the image produced by said light source on said viewing screen; and
   e) wherein an N×M image generated by said light source means is parltioned into a (N/(n+g))×(M/(m+g)) array of light source cells where N is the width of the image, M is the height of the image, n is the cell height in pixels, m is the cell width in pixels and g is the pixel size of the gap between cells.

2. The system of claim 1 wherein said first pixel density of said screen surface is greater than said second pixel density of said light source means.

3. The system of claim 1 wherein said light source means is a homogeneous emitting light source.

4. The system of claim 1 wherein said light source means is a homogeneous projecting light source.

5. The system of claim 1 wherein said light source means is a heterogeneous combination of multiple homogeneous emitting and/or projecting light sources.

6. The system of claim 1 wherein said light source means lie in close proximity to said viewing surface.

7. The system of claim 1 wherein said light source means is remotely located from said viewing surface.

* * * * *